United States Patent [19]

Rahmlow

[11] Patent Number: 5,432,638
[45] Date of Patent: Jul. 11, 1995

[54] SPATIALLY TUNABLE RUGATE NARROW REFLECTION BAND FILTER AND APPLICATIONS THEREFOR

[75] Inventor: Thomas D. Rahmlow, Bethlehem, Conn.

[73] Assignee: Hughes Aircraft Company, Los Angeles, Calif.

[21] Appl. No.: 862,853

[22] Filed: Apr. 3, 1992

[51] Int. Cl.$^6$ ............................................. G02B 5/00
[52] U.S. Cl. ........................................ 359/588; 359/586; 359/589
[58] Field of Search .......................... 359/586, 589, 588

[56] References Cited

U.S. PATENT DOCUMENTS

| | | | |
|---|---|---|---|
| 2,708,389 | 5/1955 | Kavanagh | 88/112 |
| 3,442,572 | 5/1969 | Illsley et al. | 350/166 |
| 4,187,475 | 2/1980 | Wieder | 331/94.5 |
| 4,346,992 | 8/1982 | Schwartz | 356/73 |
| 4,583,822 | 4/1986 | Southwell | 350/164 |
| 4,952,025 | 8/1990 | Gunning, III | 350/164 |
| 4,957,371 | 9/1990 | Pellicori et al. | 356/419 |
| 5,004,308 | 4/1991 | Hall et al. | 359/588 |
| 5,181,143 | 1/1993 | Southwell | 359/586 |

FOREIGN PATENT DOCUMENTS 1208525  1/1986  U.S.S.R. .

OTHER PUBLICATIONS

"Spectral Response Calculations of Rugate Filters Using Coupled-Wave Theory", 1988 Optical Society of America, vol. 5(9), 1558-1564 (Sep. 1988) pp. 560-566; W. H. Southwell.

*Primary Examiner*—Mark Hellner
*Attorney, Agent, or Firm*—Michael W. Sales; Wanda K. Denson-Low

[57] ABSTRACT

An optical system (20) includes an optical filter (10) having a radiation receiving surface. The filter including a rugate reflection filter having a reflection wavelength characteristic that varies along an axis of the radiation receiving surface. The optical filter includes a plurality of serially disposed rugate coatings (10b, 10c) and has a wavelength rejection gradient that exhibits a linear, logarithmic, or power function of wavelength rejection as a function of position on the radiation receiving surface. The filter has a first optical density associated with a first one of the subfilms, a second optical density associated with a second one of the subfilms, and, for overlapping subfilms, a third optical density within a region wherein at least two subfilms overlap one another. The third optical density is a function of the first optical density and the second optical density. The filter is translated along one or more axes thereof for providing a tunable rejection of incident laser threat radiation.

34 Claims, 9 Drawing Sheets

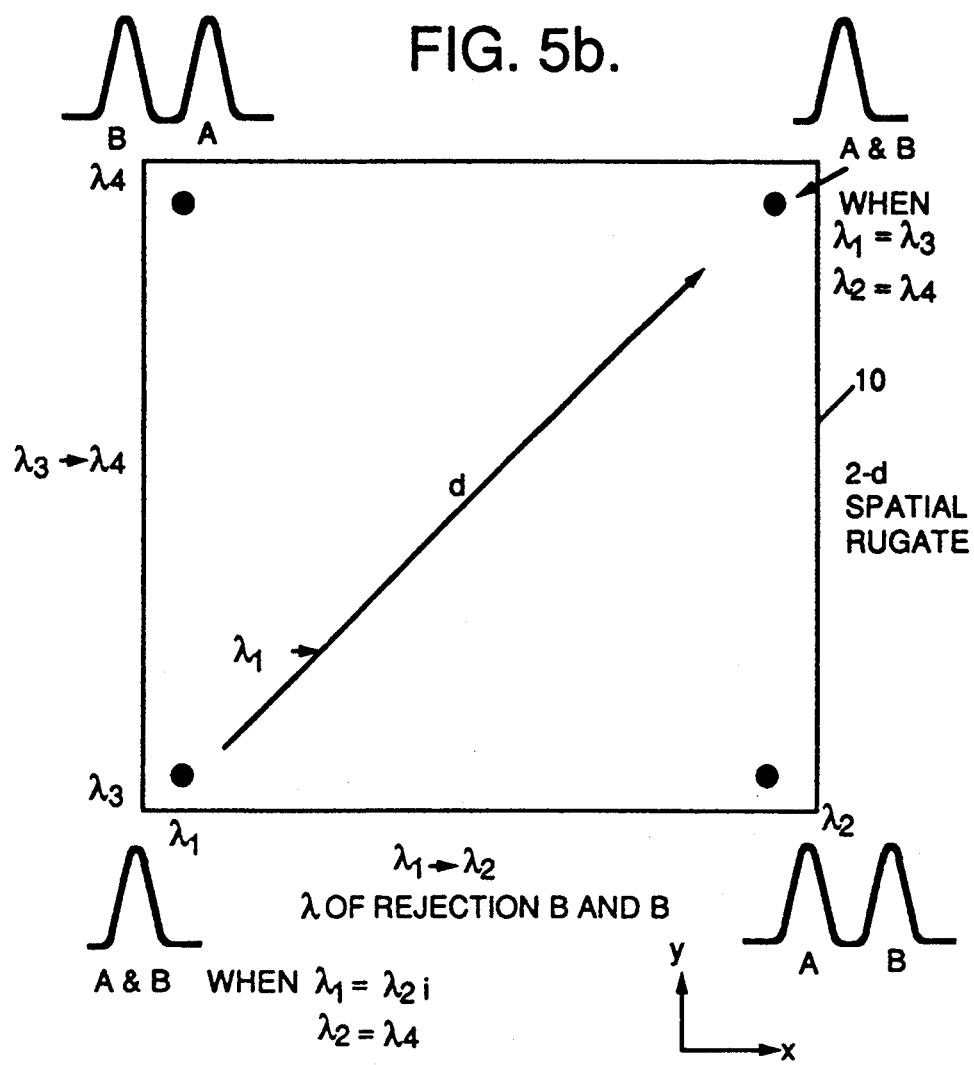
FIG. 5b.
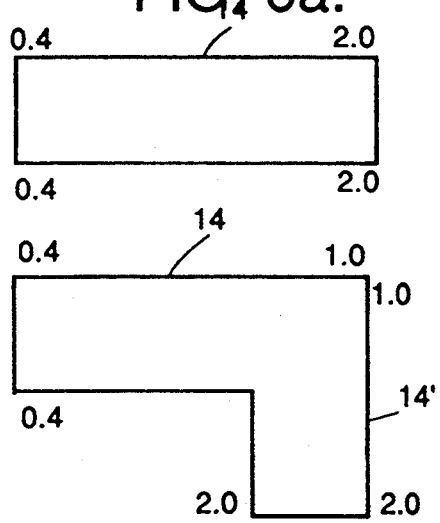
FIG. 6a.
FIG. 6b.
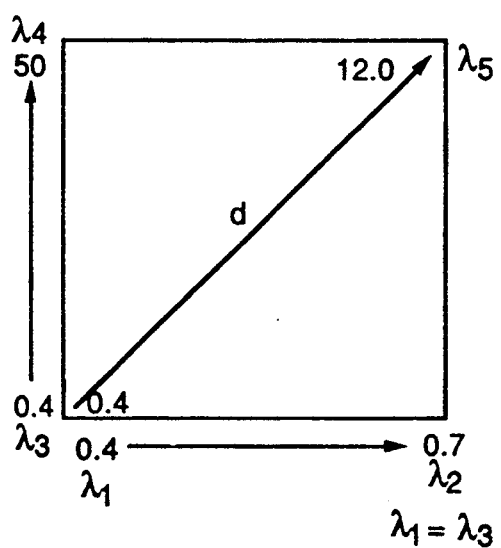
FIG. 7
$\lambda_1 = \lambda_3$
$\lambda_2 = \lambda_4$
$\lambda_5 > \lambda_1, \lambda_2, \lambda_3, \lambda_4$

SPATIALLY TUNABLE RUGATE NARROW REFLECTION BAND FILTER AND APPLICATIONS THEREFOR

CROSS-REFERENCE TO A RELATED PATENT APPLICATION

This patent application is related to commonly assigned U.S. patent application Ser. No. 07/862,858, filed on even date herewith, and entitled "Spatially Tunable Rugate Narrow Reflection Band Filter" by T. D. Rahmlow, Jr.

FIELD OF THE INVENTION

This invention relates generally to optical filters and, in particular, to optical reflection filters and to applications therefor.

BACKGROUND OF THE INVENTION

It is advantageous for many applications to provide a tunable optical filter to reflect a specific wavelength, while also maintaining a high spectral throughput for other wavelengths. A discrete reflection filter design may be made spatially tunable. However, a discrete reflection filter having a desired narrow reflection wavelength band, and also a high spectral throughput, may be difficult to achieve.

By example, laser filters are used to protect sensors and personnel from laser light (directed energy) and against jamming and damage. Laser filters are optical interference coatings which reflect specific wavelength regions and which are designed to meet specific threats. As a result, known types of laser filters are not tunable. If the threat is unknown at the time of system design, and if the system cannot be subsequently retrofitted, the system is essentially unprotected. Also, in many cases laser threats are not single wavelengths, in that laser weapons may be capable of being tuned to different wavelengths. It is difficult to protect against a broad range of threats with a single filter design, while still maintaining high system optical throughput.

One known laser protection technique employs filter wheels with broad band notches to block broad regions of the spectra. However, this approach has the negative effect of reducing overall optical throughput.

A comb filter design exhibits only a notched spectral throughput characteristic, although the comb filter may be rotatably tunable. An example of a circularly variable wide bandpass interference filter is described in U.S. Pat. No. 3,442,572, issued May 6, 1969 to R. F. Illsley et al. This filter employs a plurality of quarter wavelength thick layers of low and high index of refraction coatings.

Wedged filters are also known in the art. In U.S. Pat. No. 4,346,992, issued Aug. 31, 1982 to J. Schwartz there is described a laser detector and spectral analyzer that includes a wedge interference filter having a systematic positional variation in a thickness of deposited interference layers. This results in a systematic variation in the center of the local passband with position along a left-right axis of the filter. In U.S. Pat. No. 2,708,389, issued May 17, 1955 to F. W. Kavanagh there is described a wedged interference filter having supplementary wide passband filters. In U.S. Pat. No. 4,187,475, issued Feb. 5, 1980, to I. Wieder there is described a wedged transmission filter as an output mirror for a pulsed dye laser. In SU 1208-525-A there is described a narrow band interference filter that employs alternating layers of titanium dioxide and silicon dioxide deposited by electron beam (E-beam) evaporation.

In U.S. Pat. No. 4,957,371, issued Sep. 18, 1990 to S. F. Pellicori et al. there is described a wedge filter spectrometer having linearly tapered quarter wavelength high and low index optical coatings for spectrally dispersing incident radiation. A plurality of radiation detectors are provided for detecting the dispersed radiation.

One type of reflection filter that does exhibit a narrow wavelength reflection band, and that does not require alternating sequences of discrete quarter wavelength high and low index interference films, is known as a rugate.

In this regard reference is made to an article entitled "Spectral Response Calculations of Rugate Filters Using Coupled-wave Theory", by W. H. Southwell, Journal of the Optical Society of America, Vol. 5(9), 1558–1564(1988). This article discusses gradient-index interference filter coatings having an index of refraction that varies in a continuous fashion in a direction normal to a substrate. A narrow bandwidth reflector is shown to be achieved with a rugate coating, the bandwidth being inversely proportional to rugate thickness.

In FIG. 1 there is shown an exemplary rugate index of refraction (n) profile as a function of mechanical thickness of the rugate coating. In FIG. 1, the filter substrate is on the right, light is incident from the left, $n_o$ is the average index of refraction through the rugate, and $n_1$ is the peak index of refraction variation, which is typically small compared with $n_o$.

The word rugate, when used as a noun, is herein intended to define a gradient-index interference filter whose index of refraction profile is periodic as a function of film thickness. A typical example is a sine wave. When used as an adjective, the word rugate is herein taken to describe the periodic gradient index of refraction profile of a coating.

For a single wavelength a rugate has an index of refraction (index) profile of:

$$n = n_o + n_1 \sin(Kx + o), \quad K = 2(n_o)k, \quad k = 2\pi/\lambda,$$

where $n_o$ is an average index, $n_1$ is a peak index variation, K determines a wavelength $\lambda$ for which maximum reflection occurs, o is a starting phase of the index variation, and x is a thickness within a range of $(0 \leq x \leq L)$. The reflectivity (r) produced by this profile is approximated by:

$$r = \tanh(u/4) \exp(io)$$

$$u = KLn_1/n_o = 2\pi N n_1/n_0,$$

where $\Delta\lambda/\lambda = n_1/n_0$ is a fractional bandwidth, where N is a number of cycles in the coating, normally half integer, and L is the physical thickness of the coating. It can be seen that the maximum reflectivity at is determined by the product of the fractional index variation times the number of cycles.

For multiple wavelengths which are separated on the order of $\Delta\lambda$, a rugate may be obtained for each wavelength by summing index profiles:

$$n = n_o + \Sigma n_i \sin(K_i x + o_i),$$

as is shown in FIG. 2 for rugates A, B, and C, the summation of which provides the index variation, as a function of coating mechanical thickness, shown as D. For this technique multiple reflection bands are generated by depositing a single coating layer having an index of refraction profile which is predetermined to be the sum of the periods of the desired spectral lines. This technique is known as parallel deposition. A narrow multiple reflection notch rugate filter may also be obtained by serially depositing a plurality of coatings, each having a different index of refraction profile. That is, one coating is deposited upon another. A combination of serial and parallel rugate coating deposition techniques may also be employed.

FIG. 3 graphically illustrates a transmission plot of a typical narrow notch multiple line rugate filter, and FIG. 4 graphically illustrates a corresponding optical density plot for the multiple line rugate filter of FIG. 3. Optical density (D) is defined to be the base 10 logarithm of the reciprocal of transmittance (T):

$$D = \log_{10}(1/T), \text{ or } T = 10^{-D}.$$

As a result of these properties, a rugate filter design may greatly extend a filter's applications, in that a rugate filter has properties of narrow, high optical density and single or multiple reflection bands which lack significant harmonic structure. The rugate property of not exhibiting significant harmonics eliminates the interaction of serially disposed subfilms, or coatings, on spectral performance. In contradistinction, harmonic reflection bands in a discrete filter subfilm, that is designed to cover a long wavelength region, may adversely impact performance at a short wavelength region.

It is an object of the invention to provide radiation sensors and discriminators that include a spatially tunable rugate filter, wherein a wavelength of a reflection band is spatially varied over the filter.

SUMMARY OF THE INVENTION

The foregoing and other problems are overcome and the object of the invention is realized by an optical system that includes a rugate narrow reflection band filter having an optical interference coating that exhibits a property that the wavelength of the narrow reflection band varies continuously along an axis of the filter. Multiple optical coatings are deposited serially along different axes to provide for independent selection of single or multiple reflection band wavelengths at different spatial locations on the filter. The result is a single reflection band or a multiple reflection band filter in which the wavelength of the reflections are individually tunable by shearing, or translating, the filter along the optical coating axes. The filter is controllably translated along one or more axes thereof for providing a tunable rejection of incident laser threat radiation.

More specifically, an optical system includes an optical filter having a radiation receiving surface and a rugate reflection filter having a reflection wavelength characteristic that varies along an axis of the radiation receiving surface. The optical filter includes a plurality of serially disposed rugate coatings and has a wavelength rejection gradient that exhibits a linear, logarithmic, or power function of wavelength rejection as a function of position on the radiation receiving surface. Two or more rugate subfilms may overlap one another, or none of the rugate subfilms may overlap. The filter has a first optical density associated with a first one of the subfilms, a second optical density associated with a second one of the subfilms, and, for overlapping subfilms, a third optical density within a region wherein at least two of the subfilms overlap one another. For this case, the third optical density is a summation of the first optical density and the second optical density.

The spatially tunable rugate filter allows for a continuous variation in reflection notch position across a spectral range, thereby providing for the discrimination of and protection against a laser source having one or more spectral lines. The spatial rugate filter is placed at or near a focal plane in an optical system to attenuate, by reflection, specific wavelengths of light from the entire field of view. The filter may also placed at or near a focal plane for attenuating, by reflection, particular wavelengths at specific field of view locations. The filter may be employed to reflect a spectrum of light and to thus replace conventional spectrally dispersive elements, such as diffraction gratings and prisms.

Varying the optical coating deposition along different axes provides for independently tuning the wavelengths of multiple reflection bands. The reflection bands of serially applied coatings may have a common, or overlapping, spectral range, or the serially applied coatings may have non-intersecting spectral ranges.

One advantage of providing overlapping spectral ranges is that the filter has a region, such as a diagonally disposed stripe, wherein the optical density of the filter is the sum of the optical densities of the serially disposed rugate subfilms. This provides prescribed levels of optical density, with the number of levels being equal to the number of spatially variable subfilms. Multiple, partially overlapping subfilms may have different spectral ranges and thus afford different wavelength resolution along different axes within the same filter.

One advantage of providing non-overlapping spectral regions is to extend the response range of the filter without extending the linear dimension of the filter. That is, the filter is effectively folded in n dimensions, where n is equal to the number of serial subfilms. The selection of non-overlapping spectral regions further enables an independent selection of reflection bands for different spectral regions. This is especially useful when the filter is used with a plurality of optical sensors which perform different functions, but which use common optics.

The wavelength gradient of the filter is preferably controlled during the rugate coating deposition process. Linear, logarithmic, or power functions of wavelength (or wavenumber) versus spatial position are thereby obtained, providing for the tuning of wavelength resolution and reflected light intensity. This property may beneficially aid detector response, or reduce processing time in high speed spectral instruments. If the filter is used as a light dispersive element, those regions where a detector is less sensitive benefit from reduced resolution as a result of higher reflected light.

BRIEF DESCRIPTION OF THE DRAWING

The above set forth and other features of the invention are made more apparent in the ensuing Detailed Description of the Invention when read in conjunction with the attached Drawing, wherein:

FIG. 5b is an elevational view of the filter of FIG. 5a;

FIG. 6a illustrates a linear, spatially varying rugate filter;

FIG. 6b illustrates the linear rugate filter of FIG. 6a being folded by the addition of variable rugate layers;

FIG. 7 illustrates a rugate filter having three subfilm rugate coatings of different spectral resolution covering the range of 0.4 microns to 12.0 microns;

DETAILED DESCRIPTION OF THE INVENTION

As employed herein the term "optical coating" is intended to encompass rugate coatings that are used with radiation within the visible spectrum of wavelengths, and also coatings that are used with radiation within other wavelength bands, such as the ultraviolet (UV) and infrared (IR) spectrums.

In accordance with the invention, the rugate property of multiple reflection bands and independent bandwidths is employed to advantage to provide spatially varying rugate reflection filters for use in optical systems wherein it is desired to selectively reflect or reject one or more spectral lines. Such filters exhibit multiple regions where reflection bands are at the same wavelength, and which further have various fields of view or bandwidths. That is, the field of view is discretely tunable. The multiple reflection bands also provide performance redundancy and insure against functional failure of the filter because of a failure at a particular location on the film.

Figure 1:
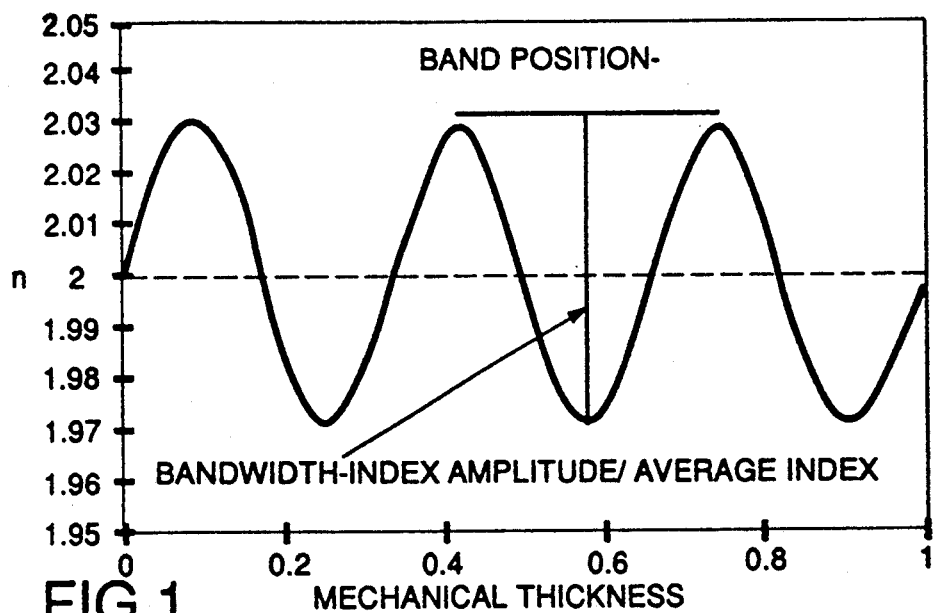
FIG. 1 is graph showing an exemplary rugate index of refraction profile as a function of mechanical thickness of the rugate coating.
Figure 3:
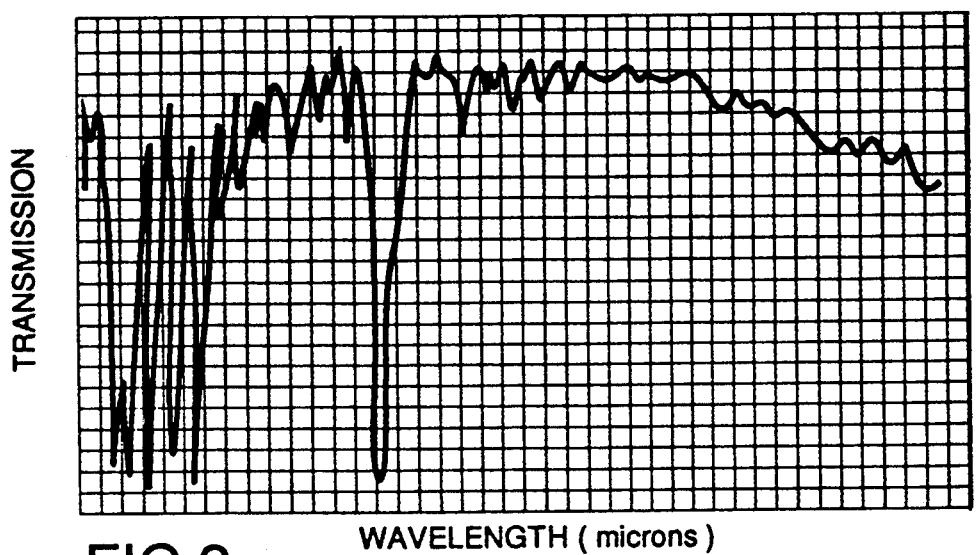
FIG. 3 graphically illustrates a transmission plot of a typical narrow notch single or multiple line rugate filter.
Figure 4:
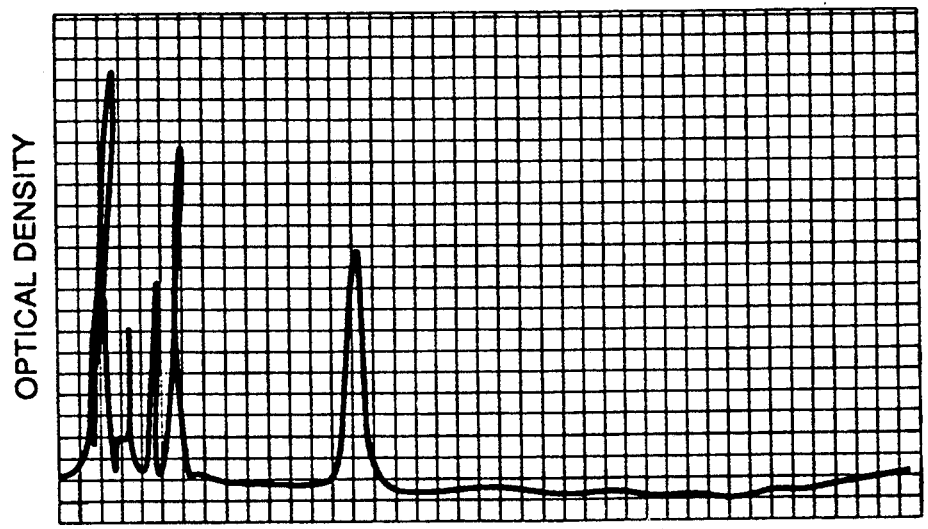
FIG. 4 graphically illustrates an optical density plot for a single or multiple line rugate filter.
Figure 2:
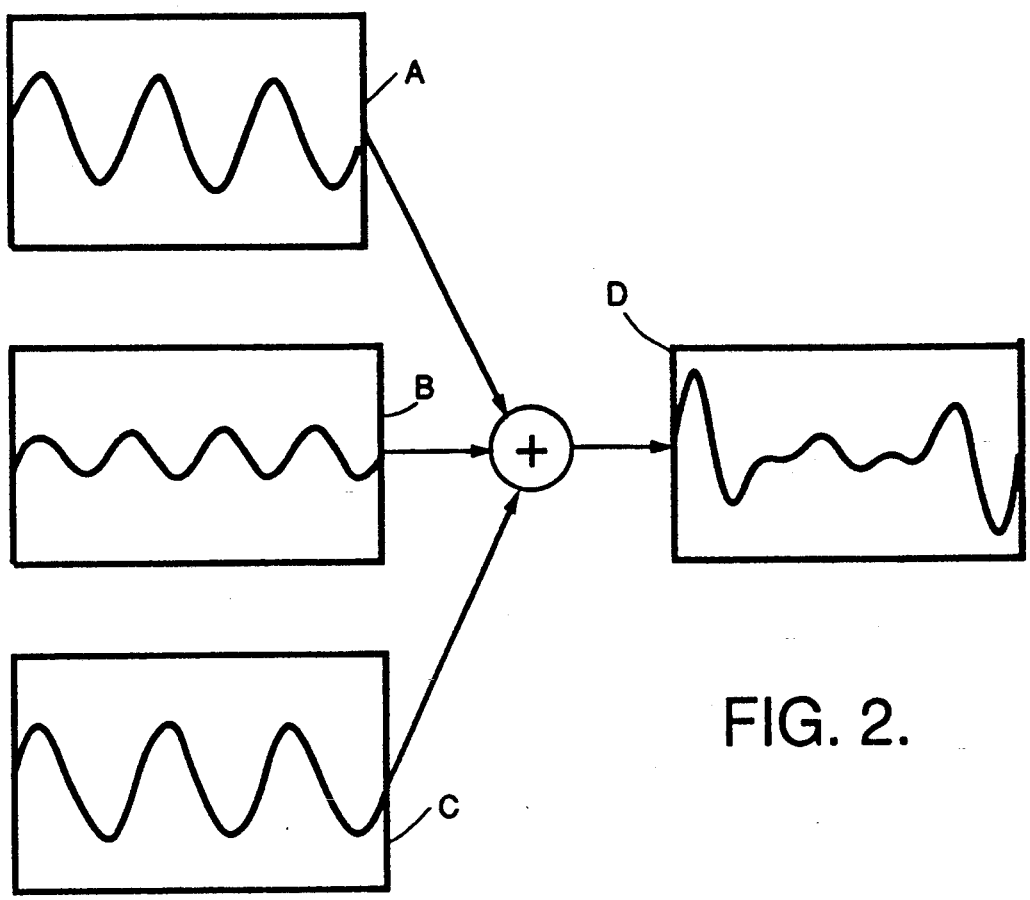
FIG. 2 illustrates in D a summation of index variations of serially disposed rugate coatings A, B, and C.
Figure 5A:
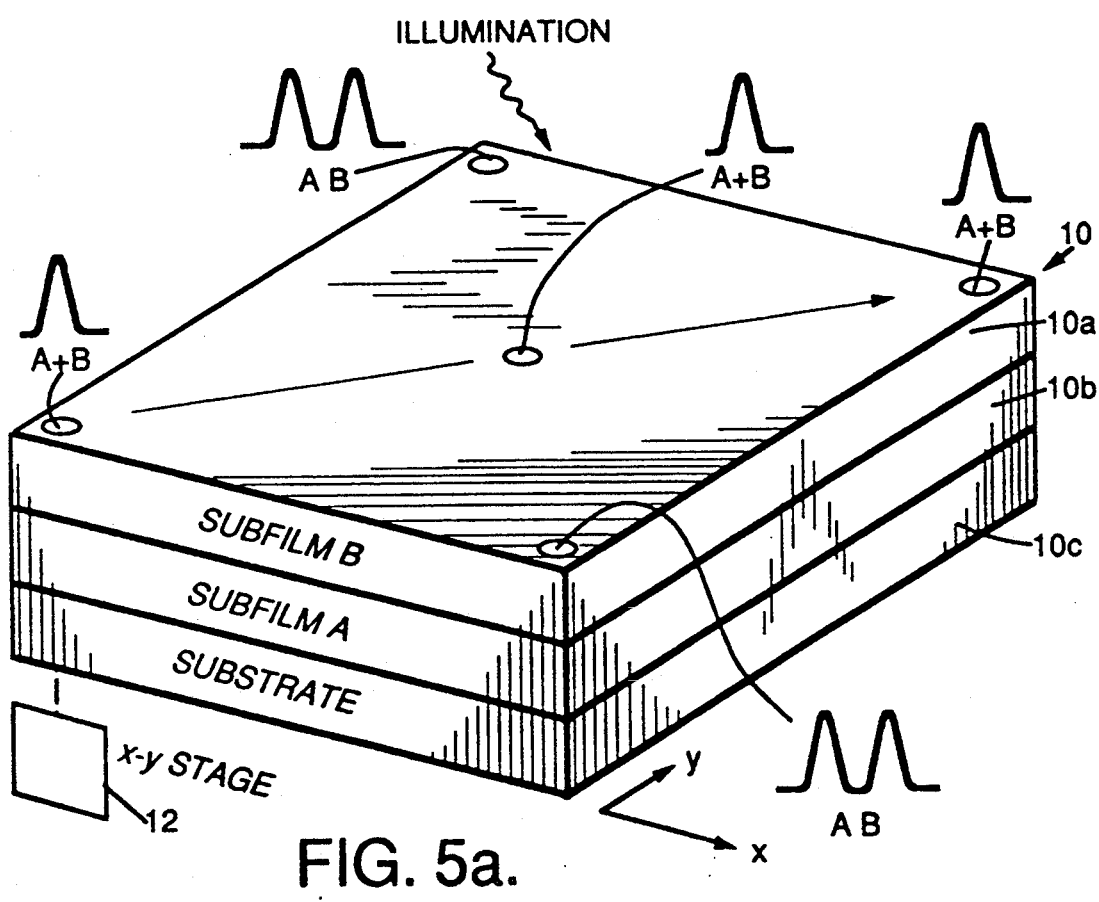
FIG. 5a is a top view that illustrates a two-axis spatial rugate reflection filter wherein the wavelength of the rejection band varies from a value of $\lambda_1$ to a value of $\lambda_2$ in the x-axis direction, and from a value of $\lambda_3$ to a value of $\lambda_4$ in the y-axis direction.

Referring to FIG. 5a, in conjunction with FIG. 5b, a spatially tunable rugate optical filter 10 provides for a reflection notch position to vary continuously along each axis of the filter. As seen in FIG. 5b the filter 10 includes overlapping rugate subfilms that are provided upon a substrate 10a. The substrate 10a is disposed beneath a rugate subfilm A. A rugate subfilm B is disposed over the subfilm A. Along the x-axis the subfilm A exhibits a variable optical thickness per rugate cycle. Along the x-axis the subfilm B exhibits a constant optical thickness per rugate cycle. Along the y-axis this relationship is reversed and the subfilm A exhibits a constant optical thickness per rugate cycle while the subfilm B exhibits a variable optical thickness per rugate cycle.

To achieve this effect, the filter 10 is rotated during coating deposition and similar coatings are deposited along each axis. This is repeated a number of times along different axes so as to independently vary the optical performance of the filter 10 along each axis.

More specifically, FIGS. 5a and 5b illustrate, in accordance with the invention, a two-axis spatial rugate reflection filter 10 wherein the wavelength of the rejection band varies from a value of $\lambda_1$ to a value of $\lambda_2$ in the x-axis direction and from a value of $\lambda_3$ to a value of $\lambda_4$ in the y-axis direction. The two axes are disposed orthogonally one to another. The two rejection bands may be individually tuned by positioning the filter with an x-y stage 12, also referred to herein as "shearing" the filter. That is, the wavelength of the first rejection band (A) is controlled by shearing the filter 10 along the y-axis, and the wavelength of the second rejection band (B) is controlled independently by shearing the filter 10 along the x-axis.

As seen in FIG. 5b, the filter 10 is comprised of two serially disposed rugate sublayers, or subfilms 10b and 10c, wherein the spectral ranges of $\lambda_1$ to $\lambda_2$ and $\lambda_3$ to $\lambda_4$ are set equal to one another. This provides a summing of the optical density along the diagonal (d) of the filter 10. For the illustrated embodiment, the optical density is 1.5 along each axis and, thus, 3.0 along the filter 10 diagonal. The provision of a plurality of serially arranged rugate subfilms provides for a plurality of levels of optical density. The filter 10, having two rugate subfilms, therefore exhibits two levels of optical density variability.

Figure 8A:
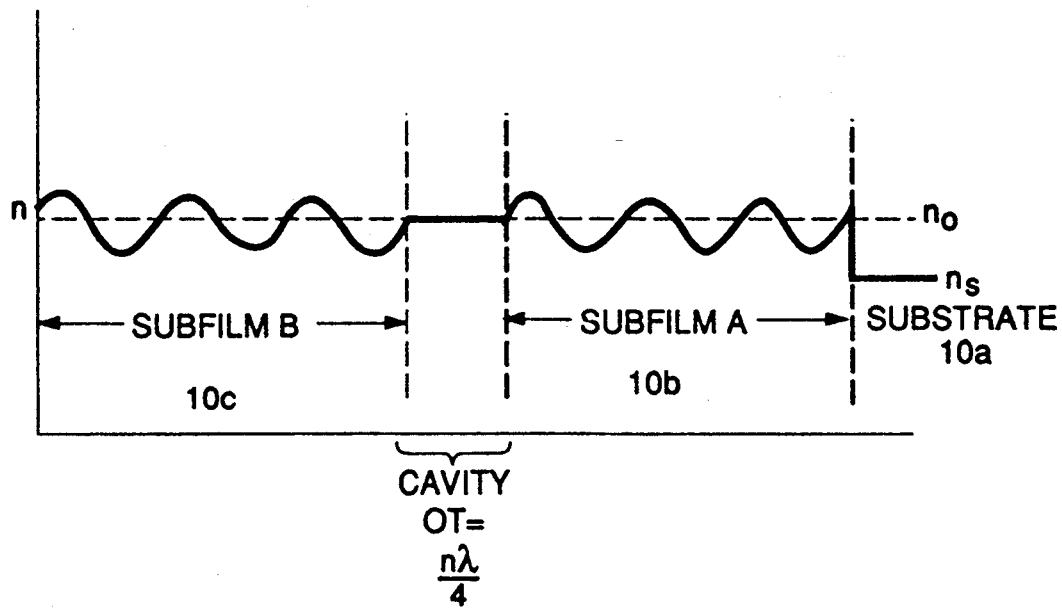
FIG. 8a is a graph that illustrates an index of refraction profile for a two subfilm, Fabry Perot, rugate filter.
Figure 8B:
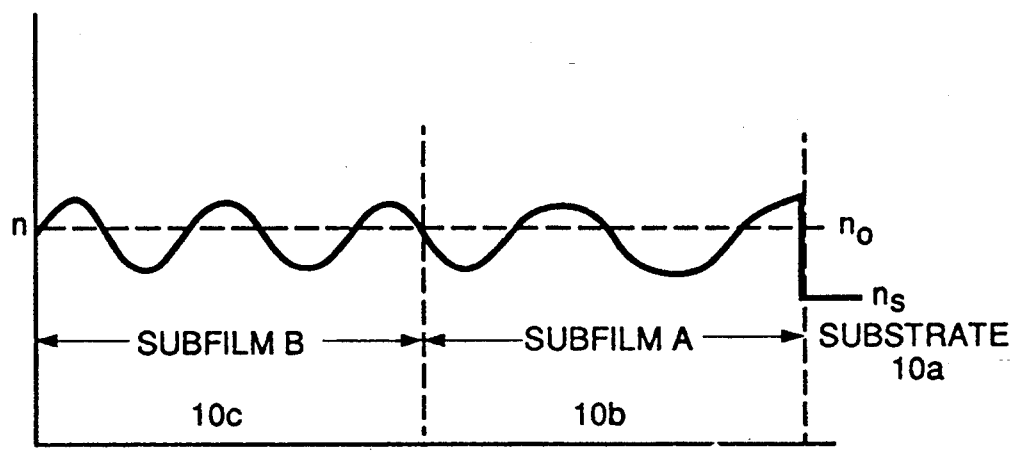
FIG. 8b is a graph that illustrates an index of refraction profile for a two subfilm all reflective rugate filter.

FIG. 8b shows the index of refraction profile for the two subfilms A and B of FIG. 5b. As can be seen, the rugate period of the subfilm B is shorter than the rugate period for subfilm A.

FIG. 8a is a graph that illustrates an index of refraction profile for a two subfilm, Fabry Perot, rugate filter embodiment of the filter 10. As can be seen, an optical cavity has an optical thickness (OT) equal to n times lambda divided by four. The optical cavity is interposed between subfilms A and B. The diagonal of such a two subfilm filter provides a bandpass function for radiation of wavelength lambda. The film orientation is changed during deposition of the constant index of refraction optical cavity, and the entire filter is fabricated during one continuous coating run.

The spatially variable rugate filters of the invention may be fabricated as a single spectral line reflection filter or as a multiple spectral line reflection filter. In general, the spatially variable rugate filters of the invention are fabricated by depositing a rugate using sources of coating material which yield spatially non-uniform material deposition. The non-uniformity of coating material deposition may be accomplished using masks to give a prescribed variation in wavelength performance across the radiation receiving surface of the filter. The variation may be designed to be linear with wavelength or wavenumber, or to vary logarithmically with wavelength or wavenumber, or to vary as a power series of wavelength or wavenumber.

Further in accordance with the invention a linear rugate filter is "folded" by the addition of variable rugate subfilms. In this regard, FIG. 6a illustrates a linear rugate filter 14 and FIG. 6b illustrates the linear rugate filter 14 of FIG. 6a being folded into a right-angle filter 14' by the addition of rugate layers. As can be seen, the linear rugate filter 14 of FIG. 6a covers the spectral range of 0.4 to 2.0 microns. The filter 14' of FIG. 6b also covers the same spectral range, but is folded at the 1.0 micron position.

FIG. 7 illustrates a rugate filter 16 having three rugate subfilm coatings of different spectral resolution covering the range of 0.4 microns to 12.0 microns. That is, filter 16 covers the spectral range from near UV to long wave infrared (LWIR). Along the y-axis the rejection wavelength band is continuous from 0.4 microns to 5.0 microns, along the x-axis the rejection wavelength band is continuous from 0.4 microns to 0.7 microns, and along the diagonal (d) the rejection wavelength band is continuous from 0.4 microns to 12.0 microns.

One advantage of providing overlapping spectral ranges is that the filter has a region, such as a diagonally disposed stripe, wherein the optical density of the filter is the sum of the optical densities of the serially disposed rugate subfilms. This provides prescribed levels of optical density, with the number of levels being equal to the number of spatially variable subfilms. Multiple, partially overlapping subfilms may have different spectral ranges and thus afford different wavelength resolution along different axes within the same filter.

One advantage of providing non-overlapping spectral regions is to extend the response range of the filter without extending the linear dimension of the filter. That is, the filter is effectively folded in n dimensions, where n is equal to the number of serial subfilms. The selection of non-overlapping spectral regions further enables an independent selection of reflection bands for different spectral regions. This is especially useful when the filter is used with a plurality of optical sensors which perform different functions, but which use common optics.

For visible wavelengths exemplary filter substrate materials are BK-7 and fused silica, and one exemplary rugate coating material combination is titanium oxide and silicon dioxide. For IR wavelengths exemplary filter substrate materials are sapphire, zinc selenide, and germanium, and one exemplary rugate coating material combination is thorium fluoride and zinc selenide.

The rugate coatings may be applied by a number of known types of coating deposition methods including, but not limited to, thermal evaporation, E-beam evaporation, and sputtering.

In particular, single subfilm and dual subfilm devices have been fabricated. These filters were made by codepositing $T_iO_2$ and $S_iO_2$. The $S_iO_2$ was held at a constant rate while the $T_iO_2$ rate was varied to give the required index variation of the deposited blended film. The substrate was oriented at an angle to the sources so as to induce a strong non-linearity in the deposited film. After a single sublayer film was deposited, the substrate was rotated 90° and deposition continued. In the case of an OD additive filter, the filter was rotated without interrupting the index modulation. In the case of the two subfilm bandpass filter, a cavity of constant index of one quarter wave thickness was deposited before resuming the rugate index profile following substrate rotation. The phase of the second rugate profile was offset by 180° with respect to the phase of the first subfilm rugate.

Having thus described in detail several embodiments of the spatially tunable rugate filter of the invention, several applications of same will now be described.

Figure 9:
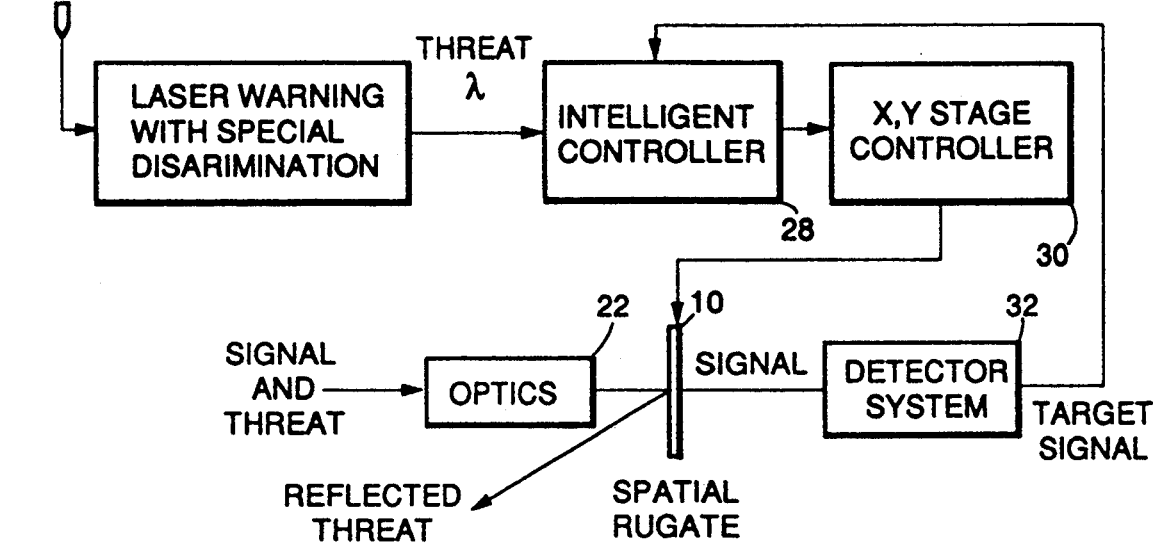
FIG. 9 is a block diagram depicting an optical system having a laser warning device, and including the spatially tunable rugate filter of the invention.

FIG. 9 is a block diagram depicting an optical signal detection system 20 that includes the spatially tunable rugate filter 10 of the invention.

The detection system 20 includes collection and focusing optics 22 for receiving an optical signal from a field of view. The optical signal may originate from, by example, a target that is to be tracked. At certain times laser threat radiation may also be present within the field of view. The laser threat radiation is received by a detector 24 having an output coupled to a laser warning system 26. By example, the detector 24 may have a wide angle lens associated therewith, the wide angle lens having a larger field of view than that of the optics 22.

Laser warning system 26 is a known type of device that is capable of resolving and identifying the wavelength of the laser threat and for providing same to an intelligent controller 28. In response to the detection of the threat radiation the intelligent controller 28 sends a signal to an x-y stage controller 30. Stage controller 30 is mechanically coupled to a spatial rugate filter that is constructed in accordance with the invention. By example, the spatial rugate filter may be constructed as in the embodiment shown in FIGS. 5a and 5b.

When no threat radiation is present the target optical signal is relayed by the optics 22 through the spatial rugate filter 10 and is detected by a detector system 32. Detector system 32 typically includes a focal plane array (FPA) of radiation detectors. By example, detector system 32 may include a CCD image sensor if the desired signal wavelengths lie within the visible spectrum. If heat (infrared) radiation is being received from the target, the radiation detectors may be an array of Group II–VI detectors.

However, the presence of the laser threat radiation may cause the detector system 32 to be overdriven or jammed, thereby adversely impacting the ability of the detector system 32 to detect the optical signal arriving from the target. In accordance with the invention, the intelligent controller 28, via the x-y stage controller 30, sheers the spatial rugate filter 10 along x and y axes so reach a position to reflect the laser threat radiation. As a result, only the desired signal radiation passes through the spatial rugate 10 to the detector system 32, thereby enabling the target to be imaged and tracked even in the presence of the laser threat radiation.

In this regard, intelligent controller 28 is responsive to the threat wavelength, as determined by laser warning system 26, so as to position the spatial rugate filter 10 at a predetermined x-y location for reflecting the threat radiation.

Figure 10A:
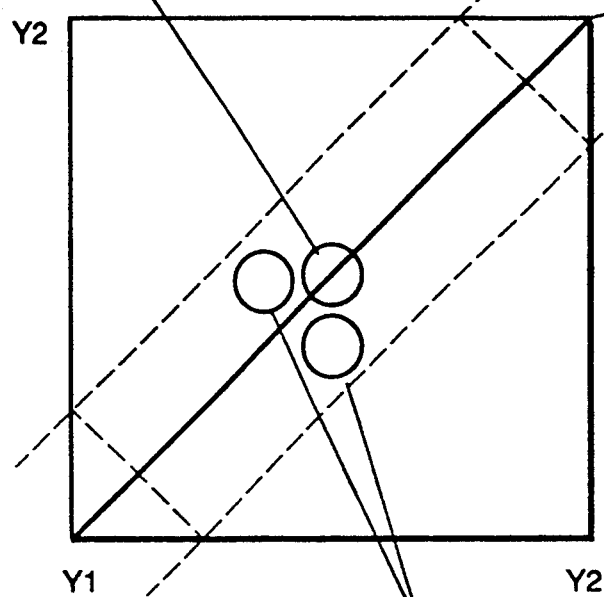
FIGS. 10a and 10b illustrate an optical density step filter.
Figure 10B:
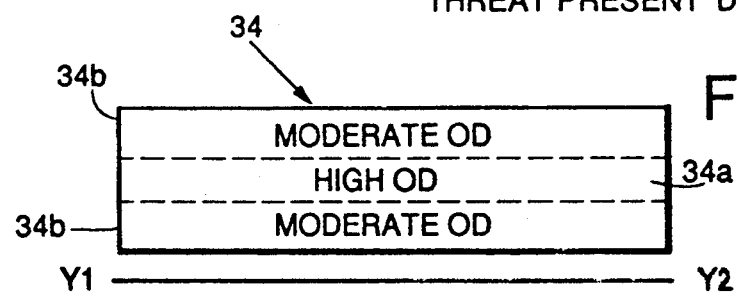
Figure 11:
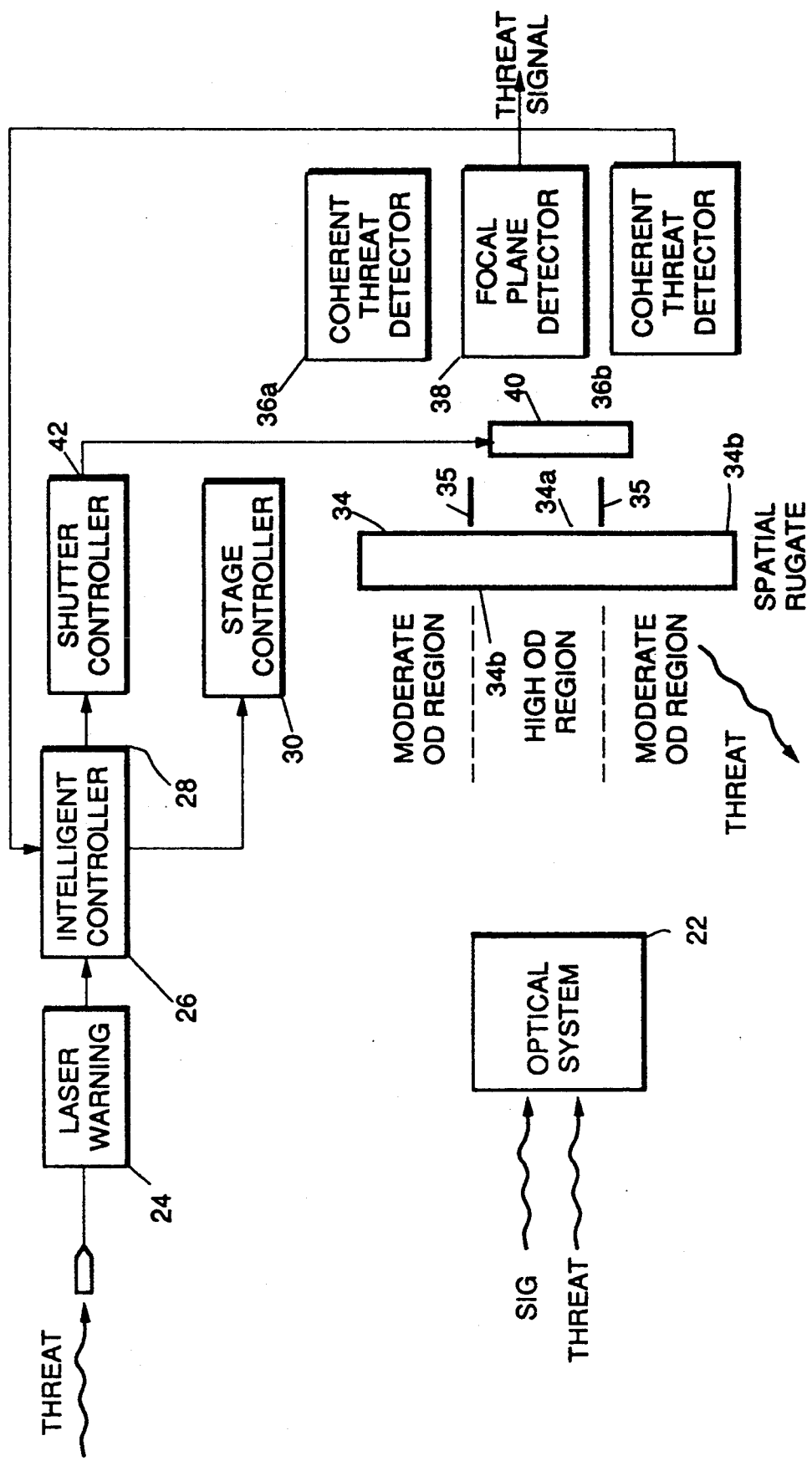
FIG. 11 is a block diagram illustrating a wavelength tunable laser energy reflection filter that employs the optical density step filter of FIGS. 10a and 10b.

FIG. 11 is a block diagram illustrating a wavelength tunable laser filter that employs the optical density step filter of FIGS. 10a and 10b.

In FIGS. 10a and 10b there is illustrated an optical density step filter 34 that is constructed with overlapping rugate subfilms, in a similar manner to the filter 10 depicted in FIGS. 5a and 5b. As can be seen in FIG. 10a, the filter 10 is cut along the dotted lines to produce the filter 34 of FIG. 10b. Filter 34 is characterized by having a high optical density region 34a along a central portion thereof. This region 34a has an optical density that is a summation of the optical densities of the overlapping surrounding regions 34b. Furthermore, the region 34a has a single reflection band (A+B) while the upper region 34b has two reflection bands (A and B) and the lower region 34b has two reflection bands (B and A), as in FIG. 5a and 5b. The region 34a is provided with a clear aperture for a focal plane detector, while the regions 34b are each provided with a clear aperture for a "threat present" detector, such as a PIN diode. Each of the apertures has a typical diameter of approximately 0.5 inches.

The filter 34 is employed in the system of FIG. 11 in conjunction with two coherent threat detector channels 36a, 36b, and a focal plane detector channel 38. Blocks in FIG. 11 that operate as in FIG. 9 are numbered accordingly.

The system of FIG. 11 further includes a shutter 40 that operates in response to a shutter controller 42. Optical baffles 35 are preferably positioned on both sides of the focal plane detector 38.

Figure 12:
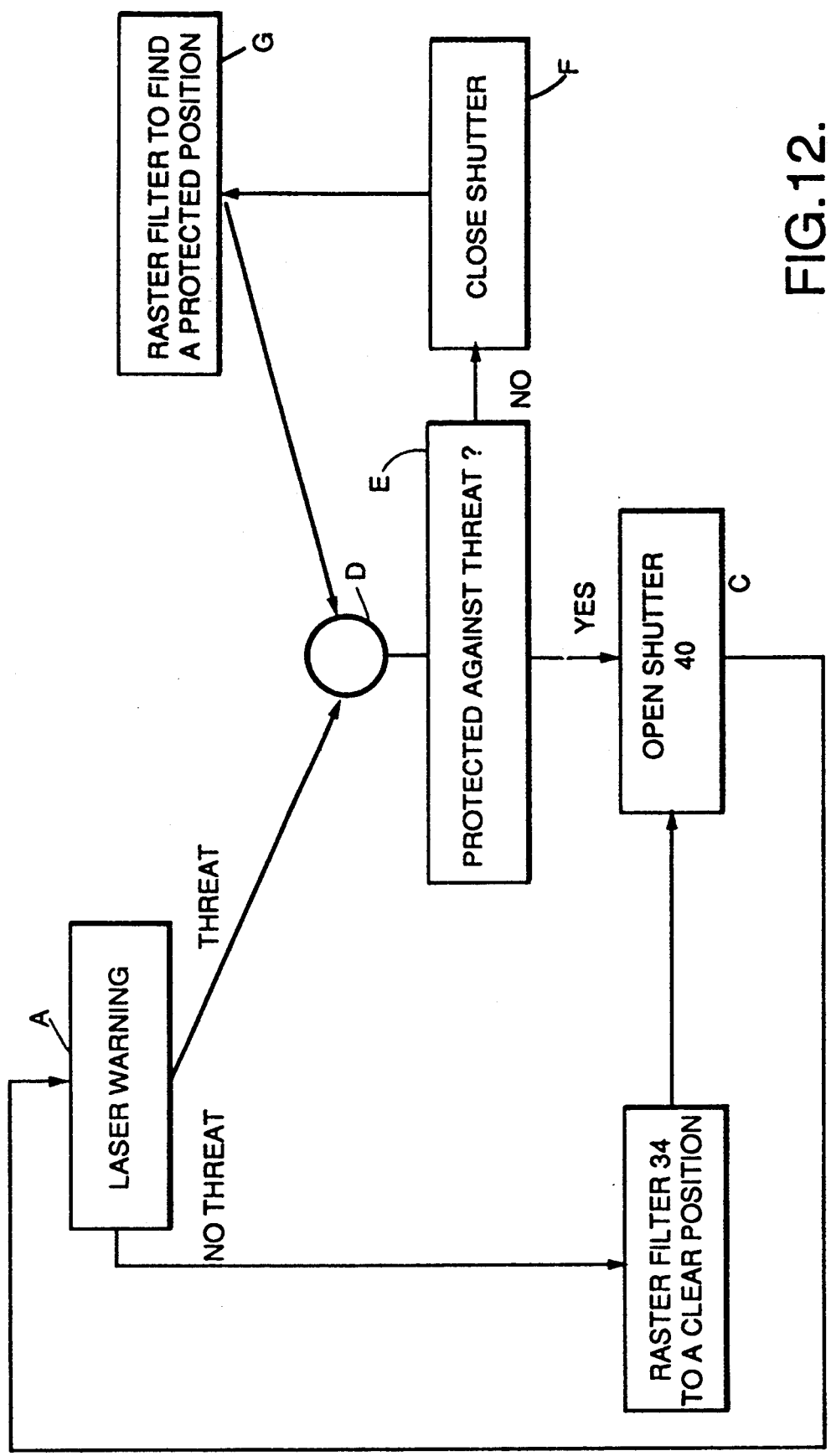
FIG. 12 is a state diagram illustrating the operation of the intelligent spatial rugate controller of FIG. 11.

FIG. 12 is a state diagram illustrating the operation of the intelligent spatial rugate controller 28 of FIG. 11. In FIG. 12 the output of the laser warning system 26 is monitored (Block A) to determine if a threat is present. If no threat is detected the spatial rugate filter 34 is sheared, or rastered, if required, to a clear aperture position (Block B) so that the focal plane detector 38 is enabled to view the scene relayed by the optical system 22. The shutter 40 is also opened, if required, (Block C). At Block A, and if a laser warning is indicated, control is passed to a node D from which the intelligent controller 28 determines, by monitoring the output of the coherent threat detector channels 36a and 36b, if laser threat radiation is passing through the spatial rugate filter 34 (Block E). If, at Block E, it is determined that the filter 34 is positioned such that the focal plane detector channel 38 is protected against the threat radiation, the shutter 40 is opened (Block C). If, at Block E, it is determined that the focal plane detector 38 is not protected against the threat radiation, control passes instead to Block F where the intelligent controller 28 commands the shutter controller 42 to close the shutter 40 over the input to the focal plane detector channel 38. After closing the shutter 40 the intelligent controller 28 shears, or rasters, the spatial rugate filter 34 in x and in y so as to locate a filter position that protects the focal plane detector channel 38 from the threat radiation (Block G). The system continues to loop through the steps D, E, F, and G until it is determined, from the output of the coherent threat detectors 36a and 36b, that the focal plane detector channel 38 is adequately protected from the threat radiation. That is, the intelligent controller 28 continues to shear the spatial rugate filter 34 until a position is found that reflects a significant portion of the threat radiation. When the filter 34 is correctly positioned, Block C is executed to open the shutter 40, thereby enabling the focal plane detector 38 to view the target signal.

It should be realized that in this embodiment of the invention that the laser warning block 26 need not include spectral discrimination capability, in that the final position of the spatial rugate filter 34 indicates to the intelligent controller 28 what wavelength is being discriminated against.

Figure 13:
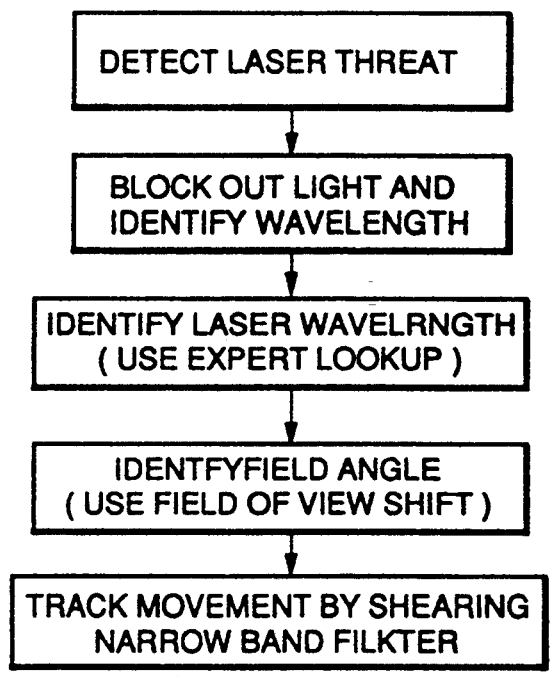
FIG. 13 is a logic flow diagram illustrating a technique for identifying threat field angle and movement using a narrow reflection band spatial rugate filter that is constructed in accordance with the invention.

A calibrated spatial rugate is employed in the logic flow diagram of FIG. 13 to identify the laser wavelength (by position of the filter) and field angle of the threat radiation. If the target or spatial rugate sensor is moving, then field direction can also be identified.

That is, FIG. 13 shows the use of the blocks 10, 22, 28, 30 and 32 of FIG. 9 to realize the operation of the laser warning and spectral discrimination block 26. In accordance with this embodiment, the system of FIG. 9 would include a first spatial rugate filter disposed in front of the detector system 32, as shown, and also a second spatial rugate filter disposed within the block 26.

At Block A in FIG. 13 laser threat radiation is detected by a radiation detector. The intelligent controller then shears the spatial rugate filter in x and in y until the detected laser threat radiation is attenuated below some predetermined threshold (Block B). Based on the final position of the spatial rugate filter the intelligent controller is enabled to determine, in accordance with a previously generated table of filter positions vs. wavelengths, the wavelength of the radiation being reflected.

Figure 15:
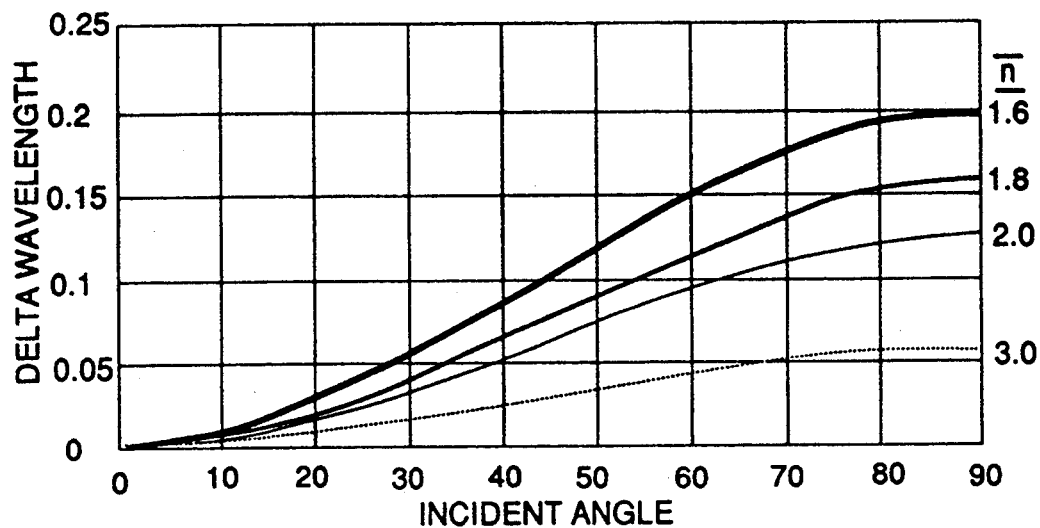
FIG. 15 is a graph depicting rugate reflection band spectral position as a function of incidence angle for four values of average index of refraction.

FIG. 15 is a graph showing rugate reflection band spectral position as a function of incidence angle for four values of average index of refraction, as given by Southwell in the aforementioned article. As the angle of the incoming beam deviates from the normal surface angle, the position of the reflection band shifts towards shorter wavelengths. To compensate for this shift in the reflection band, the filter may be translated. An estimate of the amount of translation required, as a function of incidence angle, is illustrated in the graph of FIG. 16.

Figure 16:
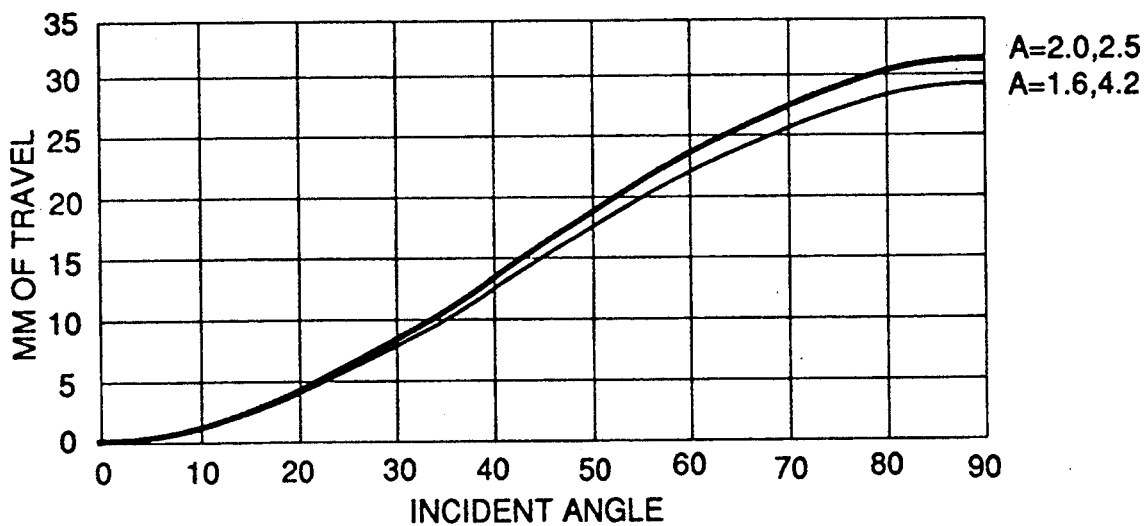
FIG. 16 is a graph depicting a number of millimeters of translation required to block a 632.8 nanometer laser, as a function of field angle.

FIG. 16 depicts, by example, a number of millimeters of translation required, as a function of field angle, to block a 632.8 nanometer laser. Two spatial rugate designs are illustrated, and show the ability to trade-off gradient slope (nm/mm) or filter length and average film index as a means of controlling filter sensitivity to changes in field of view. The filter is seen to be most sensitive for field angles of 20° to 70°. The sensitivity in this field angle range is approximately 0.5 mm of travel per degree.

In that the wavelength of the rejection line of the spatial rugate filter is generally inversely proportional to field of view angle of the optical system, the identified wavelength may not be equal to the transmitted threat wavelength. By example, for a Neon-Argon laser having a spectral line at 6328 Angstroms, and if the spectral line is received at a field of view angle of approximately 45 degrees, the spectral line is shifted to approximately 5853 Angstroms. As a result, the intelligent controller employs an "expert lookup" technique to correlate the measured wavelength, in conjunction with the field of view angle, with possible transmitted wavelengths. In accordance with the instant example, the expert lookup technique indexes into a lookup table with the measured wavelength and the field of view angle, and determines one or more candidate threat wavelengths. By example, the expert lookup returns a wavelength of 6328 Angstroms as a candidate laser threat wavelength (Block C).

At Block D, and having identified the laser threat wavelength, the intelligent controller identifies the field angle of the incident laser threat radiation. The field angle is identified from the measured wavelength and any deviation of the measured wavelength from the expected wavelength for the field of view angle. In accordance with the instant example, the field of view angle is 45 degrees. If the measured threat radiation is 6200 Angstroms, and if the expert lookup identifies the laser threat wavelength as being 6328 Angstroms, the operation of Block D determines that the field angle of the arriving laser threat radiation is some angle less than 45 degrees.

Figure 14:
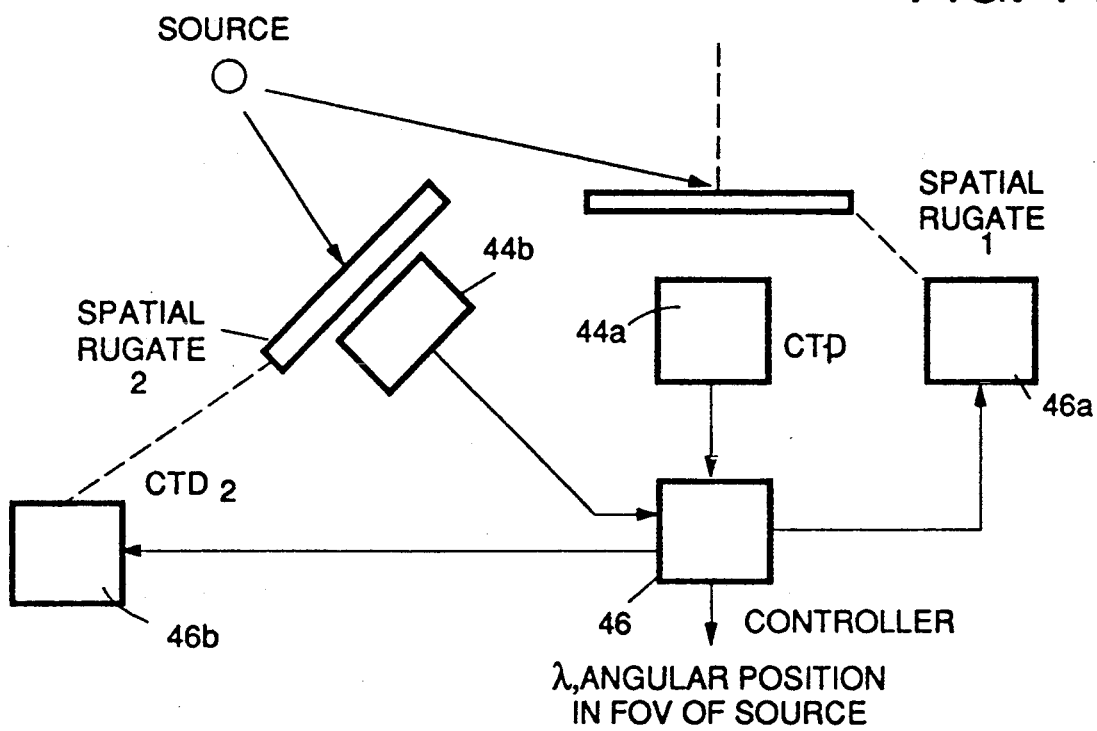
FIG. 14 illustrates the use of two spatial rugate filters for determining a location of a threat in a field of view.

It is noted that this procedure identifies a cone of field angles and does not specifically identify a location within the field of view from whence the laser threat radiation is arriving. However, this function can be achieved with the system shown in FIG. 14 that employs two spatial rugate filters, that are offset from one another, in conjunction with two coherence threat detectors (CTDs) 44a and 44b. The amount that each of the filters must be translated to block the same threat wavelength is employed by a controller 46, in conjunction with filter translation controllers 46a and 46b, to identify both a wavelength and an angular position, within a plane, of the source of the threat radiation. The system of FIG. 14 may be extended to incorporate three spatial rugate filters and three coherence detectors to triangulate in three coordinates. Positioning the filters and coherence detectors at different angles to one another compensates for a fall-off in sensitivity below approximately 20°.

Returning to FIG. 13, as the identified field angle changes in Block D, the movement of the laser threat source is tracked (Block E) by shearing the rugate spatial filter so as to maintain a condition wherein the spatial rugate filter reflects a significant amount or portion of the coherent threat radiation. Preferably, the filter is sheared until the blockage of the coherent threat radiation is maximized.

A further embodiment of the invention employs the spatially tunable rugate filter that is described in detail above as a variable bandpass filter to provide a tuning capability for, by example, optical radars. By example, a $CO_2$ optical radar is required to transmit a system frequency while blocking out and protecting against jamming from unwanted $CO_2$ frequencies which may be aimed at the radar's sensor.

As was noted above, the spatial rugate filter can be a single or multiple line reflector. An advantage of reflecting multiple lines is survivability to damage and variable bandwidths. A multiple line design allows for multiple positions on the substrate where blocking of a specific wavelength can occur. If one location is damaged, alternate locations can be selected without loss of mission capability. The advantage of variable bandwidths allows for a trade off of protection against throughput. A stationary laser threat can be blocked by a very narrow line regardless of field angle, while maintaining high out-of-band response.

While the invention has been particularly shown and described with respect to preferred embodiments thereof, it will be understood by those skilled in the art that changes in form and details may be made therein without departing from the scope and spirit of the invention.

What is claimed is:

1. A system for receiving optical radiation, said system including a radiation detector that receives radiation through an optical filter having a radiation receiving surface, said filter comprising a rugate reflection filter having a reflection wavelength that varies along an axis of the radiation receiving surface.

2. A system as set forth in claim 1 wherein the filter includes a plurality of serially disposed rugate coatings.

3. A system as set forth in claim 1 wherein the reflection wavelength varies along the axis in accordance with a linear function, a logarithmic function, or a power function.

4. A system as set forth in claim 1 including a plurality of rugate subfilms, and wherein at least two of said subfilms overlap one another.

5. A system as set forth in claim 1 including a plurality of rugate subfilms, and wherein none of said subfilms overlap one another.

6. A system as set forth in claim 4 wherein said filter has a first optical density associated with a first one of said at least two subfilms, a second optical density associated with a second one of said at least two subfilms, and a third optical density within a region wherein said at least two subfilms overlap one another.

7. A system as set forth in claim 6 wherein the third optical density is a summation of the first optical density and the second optical density.

8. A system as set forth in claim 2 and further including an optical cavity that is interposed between two of said plurality of serially disposed rugate coatings.

9. A system for receiving optical radiation, said system including a radiation detector that receives radiation through an optical filter having a radiation receiving surface, the optical filter having the radiation receiving surface at least partially bounded by a first edge and by a second edge, the first edge and the second edge meeting at a first corner, said filter comprising a rugate reflection filter having a reflection wavelength characteristic that varies continuously from the first corner, and along the first edge, from a first reflection wavelength of $\lambda_1$ to a second reflection wavelength of $\lambda_2$, said filter further having a reflection wavelength characteristic that varies continuously from the first corner, and along the second edge, from a third reflection wavelength of $\lambda_3$ to a fourth reflection wavelength of $\lambda_4$.

10. A system as set forth in claim 9 wherein $\lambda_1$ is equal to $\lambda_3$, and wherein $\lambda_2$ is equal to $\lambda_4$.

11. A system as set forth in claim 9 wherein $\lambda_1$ is equal to $\lambda_3$, and wherein $\lambda_2$ is not equal to $\lambda_4$.

12. A system as set forth in claim 11 wherein the optical filter has a reflection wavelength of $\lambda_5$ at a second corner diagonally opposite the first and $\lambda_4$.

13. A system as set forth in claim 9 wherein the filter includes a plurality of serially disposed rugate coatings.

14. A system as set forth in claim 9 wherein the reflection wavelength varies, along the first edge and along the second edge, in accordance with a linear function, a logarithmic function, or a power function.

15. A system as set forth in claim 9 including a plurality of rugate subfilms, and wherein at least two of said subfilms overlap one another.

16. A system as set forth in claim 9 including a plurality of rugate subfilms, and wherein none of said subfilms overlap one another.

17. A system as set forth in claim 15 wherein said filter has a first optical density associated with a first one of said at least two subfilms, a second optical density associated with a second one of said at least two subfilms, and a third optical density within a region wherein said at least two subfilms overlap one another, and wherein the third optical density is a summation of the first optical density and the second optical density.

18. A system as set forth in claim 13 and further including an optical cavity that is interposed between two of said plurality of serially disposed rugate coatings.

19. A system as set forth in claim 9 and further including:

means for detecting a presence of undesired radiation; and means, responsive to the detection of undesired radiation, for translating said filter so as to cause said filter to reflect a significant portion of the undesired radiation so as to prevent the undesired radiation from reaching said radiation detector.

20. A method of operating an optical system, the optical system including a radiation detector that receives desired radiation through a rugate reflection filter having a radiation receiving surface at least partially bounded by a first edge and by a second edge, comprising the steps of:

detecting a presence of undesired optical radiation;

shearing the filter in a direction along the first edge for varying a reflection wavelength characteristic from a first reflection wavelength of $\lambda_1$ to a second reflection wavelength of $\lambda_2$; and shearing the filter in a direction along the second edge for varying a reflection wavelength characteristic from a third reflection wavelength of $\lambda_3$ to a fourth reflection wavelength of $\lambda_4$, wherein the steps of shearing cause a significant amount of the undesired optical radiation to be reflected from the filter and not received by the radiation detector.

21. A method as set forth in claim 20 wherein the step of detecting includes a step of identifying a wavelength of the undesired radiation, and wherein the steps of shearing position the filter at a predetermined location for reflecting the identified wavelength.

22. A method as set forth in claim 20 and further including a step of, responsive to a final position of the filter after the steps of shearing, identifying a wavelength of the undesired radiation.

23. A method as set forth in claim 22 wherein the step of identifying includes a step of determining a wavelength of the source of the undesired radiation as a function of the identified wavelength and as a function of a field of view angle of the optical system.

24. A method as set forth in claim 23 and, responsive to the determination of the wavelength of the source, and in accordance with the field of view angle, including a step of determining an angle of arrival of the undesired radiation within the field of view.

25. An optical system comprising:

an optical filter having a radiation receiving surface, said optical filter comprising a rugate reflection filter having a reflection wavelength that varies along an axis of the radiation receiving surface;

a radiation detector for receiving optical signals arriving from a field of view, the optical signals passing through said optical filter;

means for detecting a presence of undesired optical signals arriving within the field of view; and control means, having an input coupled to an output of said detecting means and an output coupled to said optical filter, for translating said optical filter along at least one axis thereof for causing the undesired optical signals to be reflected away from the radiation receiving surface of the filter.

26. An optical system as set forth in claim 25 and further including an optical shutter that is interposed between said optical filter and said radiation detector, and wherein said control means further has an output coupled to said optical shutter for closing same during a time that said optical filter is translated.

27. An optical system as set forth in claim 25 wherein said radiation detector includes a focal plane detector means and at least one coherent threat detector means.

28. An optical system as set forth in claim 25 wherein said detecting means includes means for determining a wavelength of the undesired optical signal, and wherein said control means is responsive to said determined wavelength for positioning said optical filter at a predetermined location for reflecting the undesired optical signal.

29. An optical system as set forth in claim 25 wherein said control means is responsive to a final position of said optical filter for determining a wavelength of said undesired optical signal.

30. An optical system as set forth in claim 25 wherein said control means is responsive to a final position of said optical filter for determining a wavelength of said undesired optical signal and a field angle of said undesired optical signal.

31. An optical system as set forth in claim 25 wherein said control means is responsive to a determined wavelength of said undesired optical signal, and to a field of view angle, for determining a wavelength output by a source of the undesired optical signal.

32. An optical system as set forth in claim 25 wherein said optical filter includes a plurality of serially disposed rugate coatings.

33. An optical system as set forth in claim 25 wherein said optical filter includes a plurality of rugate subfilms, wherein at least two of said subfilms overlap one another, wherein said filter has a first optical density associated with a first one of said at least two subfilms, a second optical density associated with a second one of said at least two subfilms, and a third optical density within a region wherein said at least two subfilms overlap one another, and wherein a value of the third optical density is a function of a value of the first optical density and a value of the second optical density.

34. An optical system comprising:

a plurality of optical filters each having a radiation receiving surface for receiving coherent radiation that arrives from a field of view, each of said optical filters comprising a rugate reflection filter having a reflection wavelength that varies along an axis of the radiation receiving surface;

a plurality of coherent radiation detector means individual ones of which are associated with one of said plurality of optical filters for detecting a presence of coherent radiation arriving within the field of view of said associated optical filter; and control means having inputs coupled to an output of each of said coherent radiation detector means and outputs coupled to each of said optical filters for translating each of said optical filters along at least one axis thereof for causing the coherent radiation to be reflected away from the radiation receiving surface of the filters, said control means being responsive to a final position of each of said optical filters, wherein a maximum amount of coherent radiation is reflected away, for determining a wavelength of said coherent radiation and an angular position of a source of the coherent radiation.

* * * * *